United States Patent
Hosoe et al.

(10) Patent No.: US 9,371,912 B2
(45) Date of Patent: Jun. 21, 2016

(54) SLIDING PARTS

(75) Inventors: Takeshi Hosoe, Tokyo (JP); Hideyuki Inoue, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/240,646

(22) PCT Filed: Aug. 13, 2012

(86) PCT No.: PCT/JP2012/070646
§ 371 (c)(1),
(2), (4) Date: Feb. 24, 2014

(87) PCT Pub. No.: WO2013/035503
PCT Pub. Date: Mar. 14, 2013

(65) Prior Publication Data
US 2014/0217676 A1    Aug. 7, 2014

(30) Foreign Application Priority Data

Sep. 10, 2011    (JP) .................................. 2011-197732

(51) Int. Cl.
*F16J 15/34* (2006.01)
*F16J 15/40* (2006.01)

(52) U.S. Cl.
CPC .............. *F16J 15/34* (2013.01); *F16J 15/3404* (2013.01); *F16J 15/3408* (2013.01); *F16J 15/3412* (2013.01); *F16J 15/3424* (2013.01); *F16J 15/3428* (2013.01); *F16J 15/40* (2013.01)

(58) Field of Classification Search
CPC ... F16J 15/3408; F16J 15/3412; F16J 15/342; F16J 15/3424; F16J 15/3428; F16J 15/3448
See application file for complete search history.

(56) References Cited

U.S. PATENT DOCUMENTS

| | | | |
|---|---|---|---|
| 5,447,316 A * | 9/1995 | Matsui | .......................... 277/400 |
| 5,529,317 A * | 6/1996 | Muller | .......................... 277/400 |
| 5,529,318 A | 6/1996 | Fuse et al. | |
| 5,664,787 A | 9/1997 | Fuse et al. | |
| 2002/0109302 A1 | 8/2002 | Muraki | |

(Continued)

FOREIGN PATENT DOCUMENTS

| | | |
|---|---|---|
| CN | 102022542 A | 4/2011 |
| JP | H04-000073 A | 1/1992 |

(Continued)

OTHER PUBLICATIONS

International Search Report (ISR), mailed Sep. 25, 2012, issued for International Application No. PCT/JP2012/070646.

(Continued)

*Primary Examiner* — Kristina Fulton
*Assistant Examiner* — Nicholas L Foster
(74) *Attorney, Agent, or Firm* — Law Office of Katsuhiro Arai (57) ABSTRACT

Sliding parts are provided where a plurality of dynamic pressure-generating grooves for generating dynamic pressure via the relative rotational sliding of the stationary ring and the rotating ring are formed in a circumferential direction on a sealing face of one of a stationary ring and the rotating ring so as to communicate with a sealed fluid-containing space, and pumping areas for generating pumping action via the relative rotational sliding of the stationary ring and the rotating ring are formed within the dynamic pressure-generating grooves.

13 Claims, 5 Drawing Sheets

(56) References Cited

U.S. PATENT DOCUMENTS

| | | | |
|---|---|---|---|
| 2007/0296156 A1* | 12/2007 | Yanagisawa et al. | 277/352 |
| 2011/0101616 A1 | 5/2011 | Teshima et al. | |
| 2012/0217705 A1* | 8/2012 | Hosoe et al. | 277/400 |

FOREIGN PATENT DOCUMENTS

| | | |
|---|---|---|
| JP | H04-337165 A | 11/1992 |
| JP | H07035242 | 2/1995 |
| JP | H07-260009 A | 10/1995 |
| JP | 2002-235858 A | 8/2002 |
| JP | 2006-022834 A | 1/2006 |
| JP | 2009014183 | 1/2009 |
| WO | 2009/087995 A1 | 7/2009 |

OTHER PUBLICATIONS

A Notification of Reasons for Refusal issued by the State Intellectual Property Office of China, mailed Apr. 24, 2015, with a search report (Apr. 13, 2015) for Chinese counterpart application No. 201280040281.2.

Notification of Transmittal of Translation of the International Preliminary Report on Patentability (PCT/IB/338) mailed Mar. 20, 2014, with International Preliminary Report on Patentability (PCT/IB/373) and Written Opinion of the International Searching Authority (PCT/ISA/237), for corresponding international application PCT/JP2012/070646.

A Notification of Reasons for Refusal issued by the Japanese Patent Office, mailed Nov. 4, 2015, for Japanese counterpart application No. 2013-532517.

A Second Notification of Reasons for Refusal issued by the State Intellectual Property Office of China, mailed Dec. 9, 2015, with a search report for Chinese counterpart application No. 201280040281.2.

* cited by examiner

SLIDING PARTS

This application is the U.S. National Phase under 35 U.S.C. §371 of International Application PCT/JP2012/070646, filed Aug. 13, 2012, which claims priority to Japanese Patent Application No. 2011-197732, filed Sep. 10, 2011. The International Application was published under PCT Article 21(2) in a language other than English.

TECHNICAL FIELD

The present invention relates to relatively rotating sliding parts, and in particular to sliding parts used, for example, in the field of automotive seals, general industrial mechanical seals, and other types of mechanical seals.

BACKGROUND ART

In sealing apparatus for preventing the leakage of a sealed fluid, such apparatus comprising two parts configured so as to rotate relatively to one another and so that end surfaces thereof slide along a plane, such as, for example, a mechanical seal, a balance must be struck between the two opposing conditions of seal tightness and lubrication in order to maintain seal integrity for extended periods of time. In recent years, environmental concerns in particular have led to an increase in demand for reduced friction in order to reduce mechanical damage while preventing sealed fluid leakage. Methods of reducing friction include the so-called fluid lubrication state, in which dynamic pressure is generated between sealing faces due to rotation, and the surfaces slide with a liquid film interposed therebetween. However, in such cases, positive pressure is generated between the sealing faces, so that the fluid escapes from the positive pressure portion outside of the sealing faces. Such fluid outflow constitutes leakage in the case of a seal.

Figure 5:
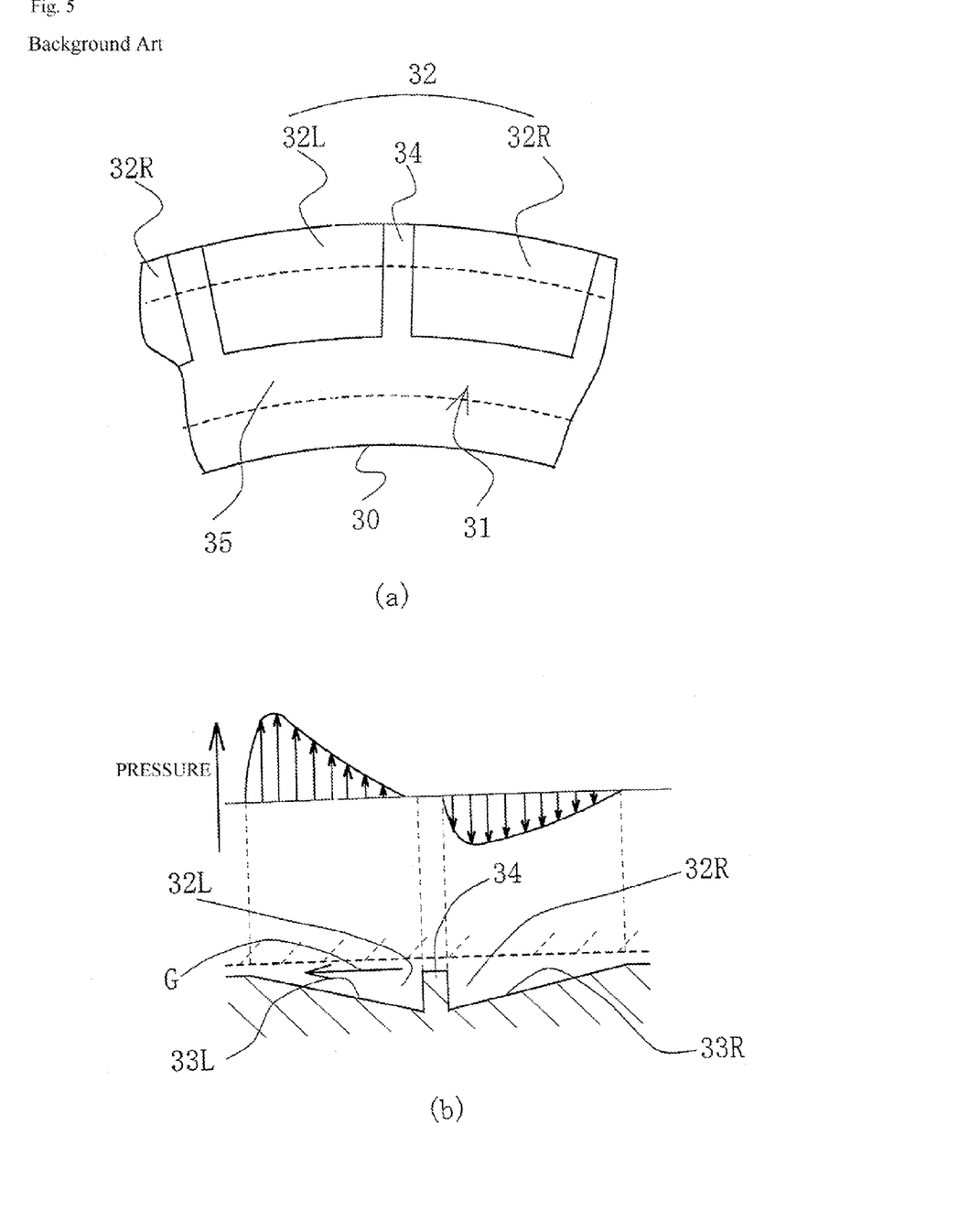
FIG. 5 is an illustration of the prior art.

Mechanical seals such as that shown in FIG. 5, in which dynamic pressure is generated between sealing faces via rotation, are known in the art ("prior art"; see, for example, patent document 1). In the prior art shown in FIG. 5, a plurality of radial grooves 32R, 32L for generating dynamic pressure during rotation is provided in the circumferential direction of a sealing face 31 of a mating ring 30 constituting one of a pair of sliding parts, with a dynamic pressure-generating groove 32 comprising tapering surfaces 33R, 33L tapering in opposite directions being formed following the circumferential direction so that the boundary between one pair of radial grooves 32R, 32L is in a trough formed by the tapering surfaces, and a dam 34 being formed at the boundary so as to separate the radial grooves 32R, 32L.

As shown in FIG. 5(b), when the sliding parts rotate relative to each another, the pressure in the radial direction groove 32R, which lies in the upstream direction of a sealed fluid flow G, decreases, creating negative buoyancy, and the wedge effect of the tapering surface 33L in the radial direction groove 32L on the downstream side of the dam 34 increases pressure, creating positive buoyancy. At this time, the action of the dam 34 decreases the negative pressure and increases the positive pressure, creating a net positive pressure and allowing a strong buoyancy to be obtained.

However, the dynamic pressure-generating groove 32 of the prior art has a shape for creating a dynamic pressure effect, and does not have an element for controlling seal integrity. Thus, there is the problem that, while dynamic pressure is generated by the dynamic pressure-generating groove 32 when the mating ring and a seal ring constituting the sliding parts rotate relative to each other, the generation of the dynamic pressure causes the fluid film to thicken, and the sealing faces of the mating ring and the seal ring break contact, so that, while sliding resistance decreases, leakage increases.

In addition, the dynamic pressure yielded by the dynamic pressure-generating groove 32 according to the prior art is not generated unless the rotating shaft reaches a certain degree of rotational speed. There is also the problem that, for this reason, sufficient quantities of sealed fluid cannot be introduced between the sealing faces during the period from when rotation begins until dynamic pressure is generated, leading to reduced lubrication and increased torque, in turn leading to the problems of seizing, vibration, noise, and the like being generated and sliding properties becoming unstable.

Examples of prior art in which dynamic pressure-generating grooves are provided in order to prevent wear during sliding part rotation are known (for example, see patent document 2), but, because these examples lack an element for controlling seal integrity, like the prior art described above, they have the problem of increased leakage.

PRIOR ART DOCUMENT

Patent Documents

Patent Document 1: Japanese Laid-Open Patent Publication H4-73

Patent Document 2: Japanese Laid-Open Patent Publication 2006-22834

SUMMARY OF INVENTION

The present invention was contrived in order to resolve the problems in the prior art, it being an object thereof to provide sliding parts that do not leak when stopped, operate under fluid lubrication and prevent leakage when rotating, including during initial rotation, and are capable of striking a balance between seal tightness and lubrication.

Means of Solving the Problem

In order to achieve the above object, a first aspect of the sliding parts according to the present invention consists in sliding parts for allowing opposing sealing faces of an annular stationary ring fixed on a fixed side and an annular rotating ring that rotates along with a rotating shaft to rotate relative to each another, thereby sealing a sealed fluid present on one side in the radial direction of the relatively rotational sealing faces; the sliding parts being characterized in:

a plurality of dynamic pressure-generating grooves for generating dynamic pressure via the relative rotational sliding of the stationary ring and the rotating ring being formed in the circumferential direction on the sealing face of one of the stationary ring and the rotating ring so as to communicate with the sealed fluid-containing space; and pumping areas for generating pumping action via the relative rotational sliding of the stationary ring and the rotating ring being formed within the dynamic pressure-generating grooves.

In accordance with the present aspect, leakage is prevented when the sliding parts are stopped, and the pumping action of the pumping areas during periods of low speed when rotation commences allows for sufficient lubrication, enabling sliding resistance to be reduced and stable sliding properties to be obtained. In addition, the dynamic pressure-generation action of the dynamic pressure-generating grooves during rotation ensures that a sufficient lubricant film is formed by the sealed fluid between the sealing faces, allowing for improved sliding properties. Leakage of the sealed fluid from the sealing faces when dynamic pressure is being generated can be controlled by the pumping action of the pumping areas, allowing for seal integrity to be controlled.

Secondly, sliding parts according to the first aspect are characterized in the pumping areas being provided with intake pumping areas operating in a direction taking in the sealed fluid and outflow pumping areas operating in a direction in which the sealed fluid is expelled.

In accordance with the present aspect, a sealed fluid flow from the sealed fluid side between the sealing faces back to the sealed fluid side is formed, thereby preventing excessive leakage during rotation, and improving seal properties.

Thirdly, sliding parts according to the first or second aspect are characterized in the pumping areas having periodic linear indentation structures, and the linear indentations being formed so that the direction of the indentations is inclined at a predetermined angle with respect to the sliding direction of the sealing faces.

In accordance with the present aspect, the pumping areas can be formed using periodic linear indentation structures, enabling easy pumping formation, and allowing for pumping performance to be modified by modifying the angle of inclination.

Fourthly, sliding parts according to the third aspect are characterized in the periodic linear indentation structures of the plurality of pumping areas being formed so that the directions of the linear indentations of adjacent pumping areas are symmetrical with respect to the sliding direction of the sealing faces.

The present aspect allows for application in cases in which the sealing faces rotate in two directions.

Fifthly, sliding parts according to the third or fourth aspect are characterized in the periodic linear indentation structures of the pumping areas being formed via irradiation with a femtosecond laser.

In accordance with the present aspect, both the directionality and machining position of the periodic linear indentation structure of the pumping areas can be controlled, enabling desired periodic linear indentation structures to be formed within each of discontinuous small divisions.

Sixthly, sliding parts according to any of the third through the fifth aspects are characterized in the depth d of the linear indentations of the pumping areas being within a range d=0.1h-10h, and the pitch p of the indentations being within a range p=0.1h-10h, h being the depth of the dynamic pressure-generating grooves.

In accordance with the present aspect, seal integrity control can be optimized, allowing for maximum improvement of seal properties.

Seventhly, sliding parts according to any of the first through sixth aspects are characterized in the radial grooves making up the plurality of dynamic pressure-generating groove groups having tapered shapes tapering in opposite directions with respect to the circumferential direction so as to increase in height as they approach a boundary therebetween, and dam parts separating the radial grooves being provided at the boundary therebetween, one pair of adjacent radial grooves being taken as a single group.

In accordance with the present aspect, the buoyancy working upon the sealing faces can be increased, allowing dynamic pressure-generating means optimally suited to mechanical seals of both high-pressure and high-speed rotation types to be achieved.

Eighthly, sliding parts according to the seventh aspect are characterized in the dynamic pressure-generating grooves extending roughly in the radial direction of the sealing face from an outer circumferential end towards an inner circumference side thereof, and bending in the inner circumferential side to form roughly L-shaped grooves extending roughly in the circumferential direction.

In accordance with the present aspect, the sealed fluid is readily drawn into the grooves, and, once drawn in, the sealed fluid is not readily expelled, allowing for strong buoyancy to be generated.

Ninthly, sliding parts according to the seventh or eighth aspect are characterized in the tapered shape of the bottom surfaces with respect to the circumferential direction within the radial grooves of the dynamic pressure-generating grooves being stepped, rectilinear, or curvilinear, and the depth of the linear indentations of the pumping areas being set so as to vary according to the depth of the radial grooves.

In accordance with the present aspect, pumping action can be generated according to the amount of sealed fluid drawn into the dynamic pressure-generating groove.

Effects of the Invention

The present invention yields the following superior effects.

(1) In accordance with the first aspect, leakage is prevented when the sliding parts are stopped, and sufficient lubrication during periods of low speed when rotation commences is possible, enabling sliding resistance to be reduced and stable sliding properties to be obtained. In addition, a sufficient lubricant film is formed by the sealed fluid between the sealing faces, allowing for improved sliding properties. Moreover, leakage of the sealed fluid from the sealing faces when dynamic pressure is being generated can be controlled by the pumping action of the pumping areas, allowing for seal integrity to be controlled.

(2) In accordance with the second aspect, a sealed fluid flow from the sealed fluid side between the sealing faces back to the sealed fluid side is formed, thereby preventing excessive leakage during rotation, and improving seal properties.

(3) In accordance with the third aspect, pumping can be easily formed, and pumping performance can be modified by modifying the angle of inclination.

(4) The fourth aspect allows for application in cases in which the sealing faces rotate in two directions.

(5) In the fifth aspect, both the directionality and machining position of the periodic linear indentation structure of the pumping areas can be controlled, enabling a desired periodic linear indentation structure to be formed within each of discontinuous small divisions.

(6) In accordance with the sixth aspect, seal integrity control can be optimized, allowing for maximum improvement of seal properties.

(7) In accordance with the seventh aspect, the buoyancy working upon the sealing faces can be increased, allowing dynamic pressure-generating means optimally suited to mechanical seals of both high-pressure and high-speed rotation types to be achieved.

(8) In accordance with the eighth aspect, the sealed fluid is readily drawn into the grooves, and, once drawn in, the sealed fluid is not readily expelled, allowing for strong buoyancy to be generated.

(9) In accordance with the ninth aspect, pumping action can be generated according to the amount of sealed fluid drawn into the dynamic pressure-generating groove.

DESCRIPTION OF EMBODIMENTS

An embodiment of the sliding parts according to the present invention will be described in detail with reference to the drawings.

In the description of the present embodiment, an example in which parts constituting a mechanical seal are sliding parts is given, but the present invention should not be construed as being limited to such; various alterations, modifications, and improvements may be made according to the knowledge of a person skilled in the art within the scope of the present invention.

Figure 1:
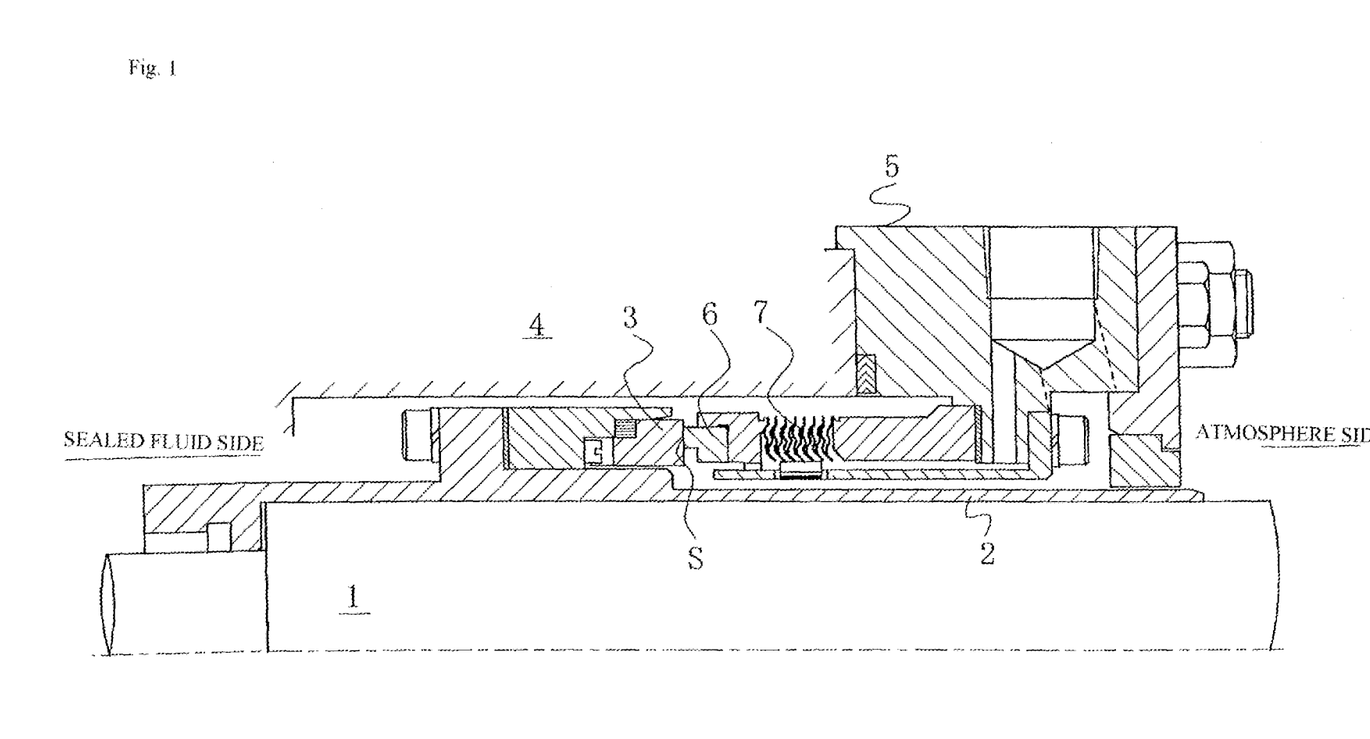
FIG. 1 is a front cross-sectional view of an example of a mechanical seal for general industrial machinery.

FIG. 1 is a front cross-sectional view of an example of a mechanical seal for general industrial machinery.

The mechanical seal shown in FIG. 1 is an inside-type seal for sealing a sealed fluid attempting to leak from the outer circumference of a sealing face in the inner circumference direction, in which an annular rotating ring 3 rotatably provided integrally with a rotating shaft 1 for driving a sealed fluid-side pump impeller (not shown), a sleeve 2 being interposed between the rotating shaft 1 and the rotating ring 3, and an annular stationary ring 6 non-rotatably but movably provided with respect to an axial direction on a seal cover 5 fixed to a pump housing 4 are configured so that sealing faces S imparted with a mirrored finish via lapping or another process slide in close contact thanks to a bellows 7 urging the stationary ring 6 in the axial direction. In other words, in this mechanical seal, the sealed fluid is prevented from escaping from the outer circumference of the rotating shaft 1 out to the atmosphere side at the sealing faces S of the rotating ring 3 and the stationary ring 6.

The rotating ring 3 and stationary ring 6 are typically both formed from SiC (a hard material), or from a combination of SiC (a hard material) and carbon (a soft material), but a sliding material used in mechanical seals can be applied as the sliding material. The SiC can be a sintered piece in which boron, aluminum, carbon, or the like is used as a sintering aid, or another material having two or more types of phases of differing components or composition, such as SiC containing dispersed graphite particles, reaction-sintered SiC of SiC and Si, SiC—TiC, SiC—TiN, and the like. The carbon can be carbon containing a mixture of carbon and graphite, or resin-molded carbon, sintered carbon, or the like. Apart from the abovementioned sliding materials, a metal material, resin material, surface-modified material (coating material), composite material, or the like can also be used.

Figure 2:
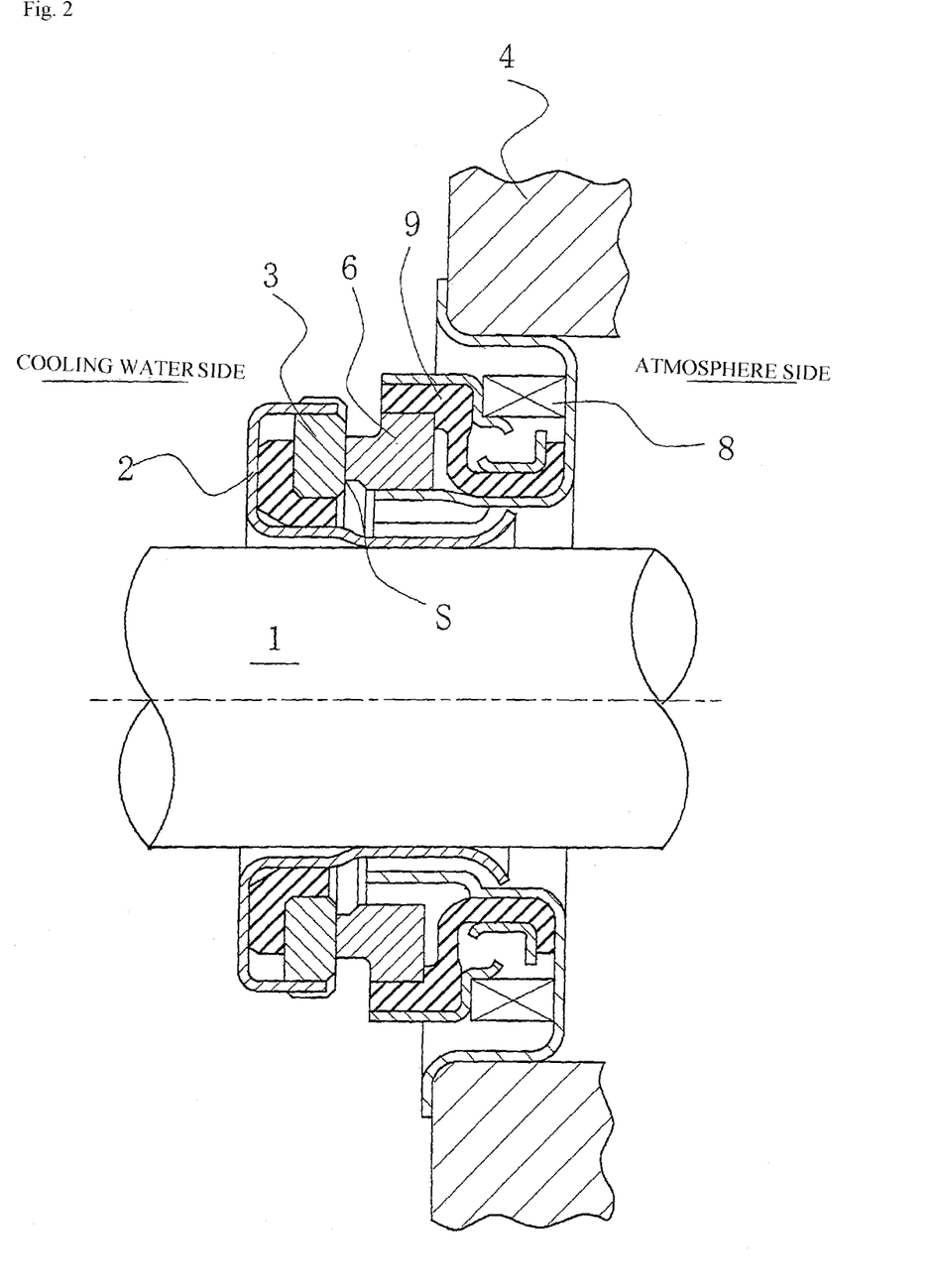
FIG. 2 is a front cross-sectional view of an example of a mechanical seal for a water pump.

FIG. 2 is a front cross-sectional view of an example of a mechanical seal for a water pump.

The mechanical seal shown in FIG. 2 is an inside-type seal for sealing cooling water attempting to leak from the outer circumference of a sealing face in the inner circumference direction, in which an annular rotating ring 3 rotatably provided integrally with a rotating shaft 1 for driving a cooling water-side pump impeller (not shown), a sleeve 2 being interposed between the rotating shaft 1 and the rotating ring 3, and an annular stationary ring 6 non-rotatably but movably provided with respect to the axial direction on a pump housing 4 are configured so that sealing faces S imparted with a mirrored finish via lapping or another process slide in close contact thanks to a coiled wave spring 8 and a bellows 9 urging the stationary ring 6 in the axial direction. In other words, in this mechanical seal, the cooling water is prevented from flowing from the outer circumference of the rotating shaft 1 out to the atmosphere side at the sealing faces S of the rotating ring 3 and the stationary ring 6.

{Embodiment 1}

Figure 3:
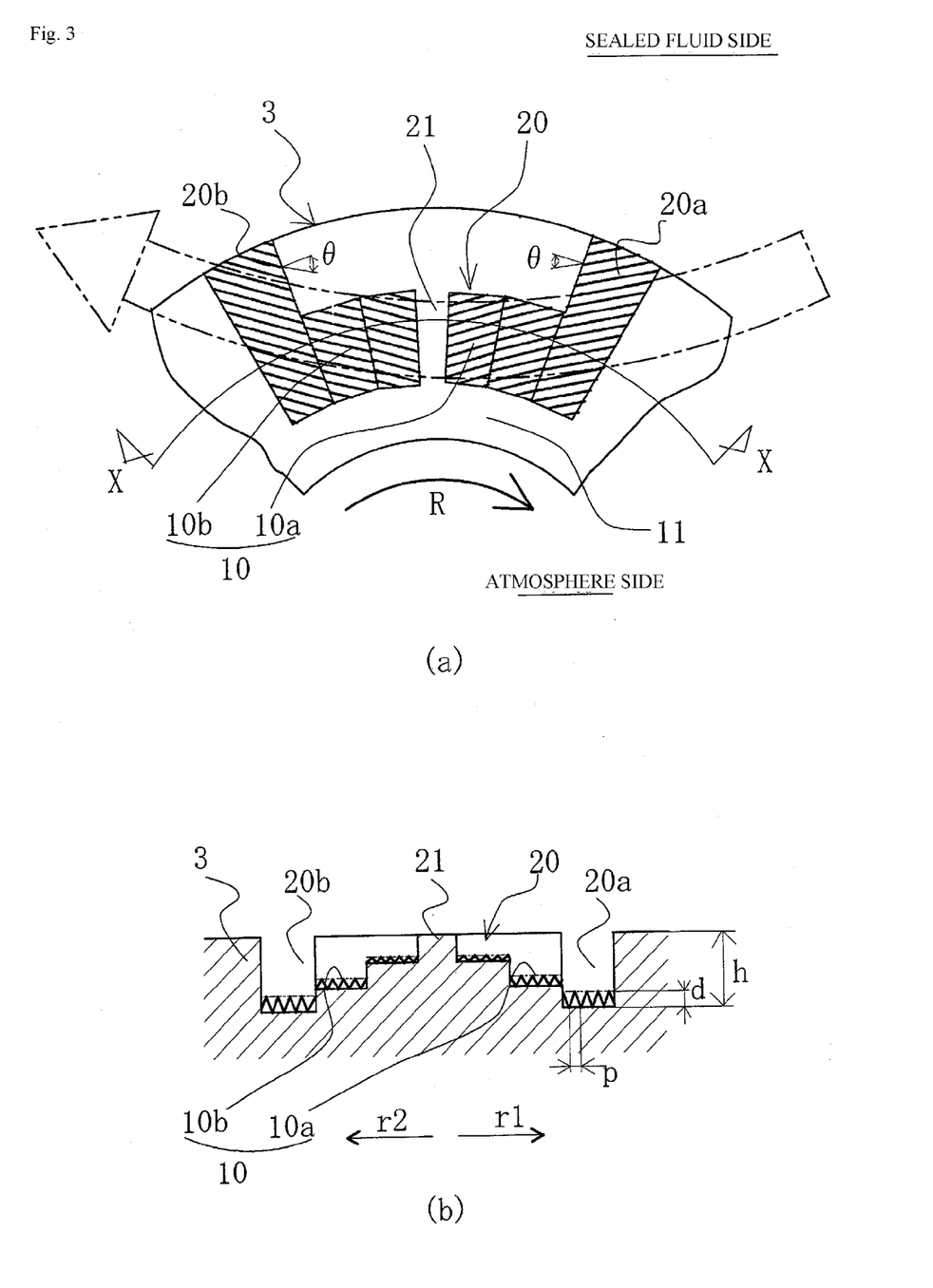
FIG. 3 is an illustration of dynamic pressure-generating grooves and pumping area formed in a sealing face of a rotating ring according to a first embodiment of the present invention, with FIG. 3(*a*) being a plan view thereof and FIG. 3(*b*) being a cross-sectional view along line X-X in FIG. 3(*a*)

FIG. 3 is an illustration of dynamic pressure-generating grooves and pumping areas formed in a sealing face of a rotating ring according to a first embodiment of the present invention, with FIG. 3(*a*) being a plan view thereof and FIG. 3(*b*) being a cross-sectional view along line X-X in FIG. 3(*a*).

In FIG. 3, the rotating ring 3 is referred to as a mating ring, and is often formed from SiC (a hard material). A plurality of dynamic pressure-generating grooves 20 is discontinuously formed in the circumferential direction of the sealing face S of the rotating ring 3. The dynamic pressure-generating grooves 20 are formed so that, taking one pair of adjacent radial grooves 20*a*, 20*b* as a single group, the radial grooves making up the plurality of dynamic pressure-generating groove groups have tapered shapes tapering in opposite directions with respect to the circumferential direction so as to increase in height as they approach a boundary therebetween, and dam parts 21 separating the radial grooves are provided at the boundaries therebetween. The number of dynamic pressure-generating grooves 20 provided on the sealing face S may be as desired, and an optimal number may be calculated according to design.

The dynamic pressure-generating grooves 20 shown in FIG. 3(*a*) extend roughly in the radial direction of the sealing face S of the rotating ring 3 from an outer circumferential end towards the inner circumference thereof, and bend in the inner circumferential side to form roughly L-shaped grooves extending roughly in the circumferential direction. The dynamic pressure-generating grooves 20 communicate with the sealed fluid side at the outer circumference of the rotating ring 3, and are configured so as to readily draw the sealed fluid into the grooves.

As shown in FIG. 3(*b*), the depth of the dynamic pressure-generating grooves 20 gradually varies along the sliding direction in the parts thereof extending in the circumferential direction. Specifically, the depth of the dynamic pressure-generating grooves 20 increases in steps in the direction indicated by arrow r1 in the radial direction groove 20*a*, and increases in steps in the direction indicated by arrow r2 in the radial direction groove 20*b*. In other words, the radial grooves 20*a* and 20*b* of the dynamic pressure-generating groove 20 increase in height as they approach the boundary therebetween.

Following the path taken by the sealed fluid as it is drawn from the sealed fluid into the grooves, the spaces between the dynamic pressure-generating grooves 20 and the opposed sealing face of the stationary ring 6 first grow narrower proceeding inward with respect to the radial direction, then, while widening again in the parts bent in the circumferential direction, grow shallower proceeding in the circumferential direction, so that the sealed fluid is ultimately compressed. The gradual compression of the sealed fluid generates dynamic pressure that works to force the rotating ring 3 and the stationary ring 6 apart. A lubricant film is thus more readily formed by the sealed fluid between the rotating ring 3 and the sealing face S of the stationary ring 6, improving sliding properties. In particular, because the dynamic pressure-generating groove has a rough letter-L shape in the dynamic pressure-generating groove 20 according to the present embodiment, the sealed fluid drawn into radial direction groove 20b is readily expelled, allowing leakage to be prevented.

The dynamic pressure-generating grooves 20 can be formed in the sealing face S, which is machined to a mirror finish, via fine machining using a $YVO_4$ laser or sandblasting. The grooves may also be formed by cutting, depending on the size of the product.

In the rotating ring according to the present embodiment, the dynamic pressure-generating grooves 20 are formed to a maximum depth of 0.1-5 μm.

Pumping areas 10 are formed within the dynamic pressure-generating grooves 20. In FIG. 3, pumping areas 10 are formed over the entire surface of the floor of the dynamic pressure-generating grooves 20, but the pumping areas 10 need not necessarily be formed over the entire surface; it is acceptable for them to be formed on only a part thereof.

In order to reduce friction upon the mechanical seal, a liquid film roughly 0.1 μm to 10 μm thick is necessary, depending on the type, temperature, and the like of the sealed fluid. In order to obtain such a liquid film, pumping areas 10 for generating pumping action via the relative rotational sliding of the stationary ring 6 and the rotating ring 3 are formed within the dynamic pressure-generating grooves 20, as described above. The pumping areas 10 are provided with intake pumping areas 10a operating in a direction in which the sealed fluid is drawn in and outflow pumping areas 10b operating in a direction in which the sealed fluid is expelled.

In FIG. 3, when the rotating ring 3 rotates in direction R, the sealed fluid is drawn into the pumping areas 10 and pushed back towards the sealed fluid side, as shown by the double-dotted dashed arrow.

A plurality of parallel linear indentations (also referred to as a "periodic linear indentation structure" in the present invention) is formed at a constant pitch in each of the pumping areas 10, the periodic linear indentation structure being a fine structure formed using, for example, a femtosecond laser.

In the present invention, the "linear indentations" encompass not only rectilinear indentations, but also somewhat curved indentations appearing during the process of forming rectilinear indentations, as well as curvilinear indentations.

In addition, as shown in FIG. 3(a), the linear indentations formed in the pumping areas 10 incline at a predetermined angle $\theta$ with respect to the sliding direction of the sealing faces S; i.e., with the direction of the tangent line of the rotation of the sealing faces S. The predetermined angle $\theta$ is preferably 10° to 80° with respect to the tangent of the rotation of the sealing face S in both the inner circumference direction and the outer circumference direction of the sealing face S.

The angle of inclination $\theta$ with respect to the tangent of rotation of the linear indentations of the pumping areas 10 in each of the plurality of pumping areas 10 may be the same for all pumping areas 10, or may differ for each of the pumping areas 10. However, because the sliding properties of the sealing faces S are affected by the angle of inclination $\theta$, imparting the linear indentations of all of the pumping areas 10 with an appropriate specific angle of inclination $\theta$ according to the desired lubricity and sliding conditions is effective in order to obtain stable sliding properties.

In the case of FIG. 3(a), the radial grooves 20a, 20b, the height of which varies in a stepped shape, are configured so that the angle of inclination $\theta$ with respect to the tangent of rotation is constant for each step.

Thus, if the sealing faces S rotatingly slide in a single direction, the angle of inclination $\theta$ of the linear indentations of the plurality of pumping areas 10 with respect to the tangent of rotation will be defined as a specific optimal angle.

When the sealing faces S rotatingly slide in both the forward and the reverse directions, the presence of both first pumping areas having linear indentations inclining at a first angle with respect to the tangent of rotation yielding suitable sliding properties during rotation in one direction and second pumping areas having linear indentations inclining at a second angle with respect to the tangent of rotation yielding suitable sliding properties during rotation in the opposite direction is preferable. Such a configuration allows suitable sliding properties to be obtained when the sealing faces S rotate in the forward and reverse directions.

More specifically, if the sealing faces S rotate in both the forward and reverse directions, the angle of inclination $\theta$ of the linear indentations of the intake pumping areas 10a and outflow pumping areas 10b are preferably formed so as to be symmetrical with respect to the tangent of rotation.

The intake pumping areas 10a and outflow pumping areas 10b are preferably formed so as to be alternatingly disposed along the circumferential direction of the sealing faces S.

The sealing faces S shown in FIG. 3 have a preferable configuration for cases in which the sealing faces S rotate in both directions.

The intake pumping areas 10a and outflow pumping areas 10b need not be alternatingly disposed along the sealing faces S in the circumferential direction, but rather, for example, two intake pumping areas 10a may be disposed for every outflow pumping area 10b; or the reverse ratio is also acceptable.

The pumping areas 10, which are structures (periodic structures of linear indentations) in which a plurality of parallel linear indentations are disposed with high precision, are strictly divided, for example, by using a femtosecond laser within a predetermined area of the sealing face S, then precisely controlling the laser and forming in the direction of the linear indentations in each division.

When a substrate is irradiated using a linearly polarized laser at an irradiation intensity near a machining threshold value, the interference of the incident light and scattered light or plasma waves along the surface of the substrate will lead to an periodic structure of linear indentations having a wavelength-order pitch and groove depth self-forming orthogonally to the polarization direction. Here, the femtosecond laser may be overlappingly operated, thereby allowing a periodic linear indentation structure pattern to be formed on the surface.

In a periodic linear indentation structure formed using a femtosecond laser in this way, the directionality thereof can be controlled, as well as the machining position, allowing a desired periodic linear indentation structure to be formed within each of disparate small divisions. Specifically, if the sealing face of an annular mechanical seal sliding member is rotating while this method is used, a fine periodic pattern can be selectively formed on the sealing face. In addition, using a machining method involving a femtosecond laser allows for the formation of a periodic structure of linear indentations of sub-micron order depth, which are effective in improving the lubrication and reducing the leakage of the mechanical seal.

The pumping areas 10 are not limited to being formed using a femtosecond laser; a picosecond laser or electron beam may also be used. The pumping areas 10 may also be formed by performing stamping or imprinting using a die provided with a periodic linear indentation structure while the sealing face of the annular mechanical seal sliding member is being rotated.

The sealed fluid side of the sealing face in which the dynamic pressure-generating grooves 20 and pumping areas 10 are formed and the opposing inner circumference side must function as a seal dam for preventing leakage when stopped. Because a seal dam area 11 for yielding this seal dam function is not fully covered by the sealed fluid (lubricating fluid), it is liable to be poorly lubricated and exhibit wear. In order to prevent wear of the seal dam area 11 and reduce sliding friction, the seal dam area 11 is preferably formed from a sliding material of superior lubricity.

The depth h of the dynamic pressure-generating grooves 20 is preferably within the range 1 µm≤h≤100 µm, and the depth d from the apexes to the troughs of the linear indentations of the pumping areas 10 is preferably within the range 0.1 µm≤d≤10 µm. The pitch p of the linear indentations of the pumping areas 10 is preferably within the range 0.1 µm≤p≤10 µm.

If the tapered shape tapering with respect to the circumferential direction of the bottom surface of the radial grooves in the dynamic pressure-generating grooves 20 is a stepped shape, as shown in FIG. 3, the depth h of the dynamic pressure-generating grooves 20 varies in stages, so that the depth d between the apexes and the troughs of the indentations within the pumping areas 10 also varies accordingly. It is thereby possible to generate pumping action according to the amount of sealed fluid drawn into the dynamic pressure-generating grooves 20.

As described above, the formation of the seal dam area 11, which is continuous with respect to the circumferential direction, prevents leakage when the sliding parts are stopped, and the sealed fluid is drawn into the pumping areas 10 and a lubricant film is formed on the sealing faces during period of low speed when rotation is beginning, thereby allowing for sufficient lubrication, and enabling sliding resistance to be reduced and stable sliding properties to be obtained.

In addition, dynamic pressure is formed on the sealing faces S by the dynamic pressure-generating grooves 20 during rotation, and a lubricant film is formed by the sealed fluid between the sealing faces S of the rotating ring 3 and the stationary ring 6, improving sliding properties. Moreover, leakage of the sealed fluid from the sealing faces when dynamic pressure is being generated can be controlled by the pumping action of the pumping areas, allowing for seal integrity to be controlled. At such time, a flow is generated whereby the sealed fluid is drawn into the intake pumping areas 10a, sent over the sealing face S to the outflow pumping areas 10b located at a separate position with respect to the circumferential direction, and returned to the sealed fluid side through the action of the outflow pumping areas 10b. The flow of the sealed fluid allows leakage during rotation to be reduced, and seal properties to be improved.

In particular, in FIG. 3, because the pumping areas 10 are formed within the dynamic pressure-generating grooves 20, the sealed fluid is drawn into the radial direction groove 20a on the right, the intake pumping areas 10a formed within the radial direction groove 20a also act to draw in the sealed fluid, the sealed fluid is expelled from the radial direction groove 20b on the left, and the outflow pumping areas 10b formed within the radial direction groove 20b act to expel the sealed fluid to the sealed fluid side. As the radial grooves and the pumping areas act to draw in and expel the sealed fluid, the amount of sealed fluid over the sealing faces S increases, and, simultaneously, a flow is formed such that the sealed fluid is drawn in from the sealed fluid side and expelled back to the sealed fluid side. A sufficient lubricant film is thereby formed by the sealed fluid between the sealing faces S, improving sliding properties, reducing sealed fluid leakage, and allowing for improved seal properties.

{Embodiment 2}

Figure 4:
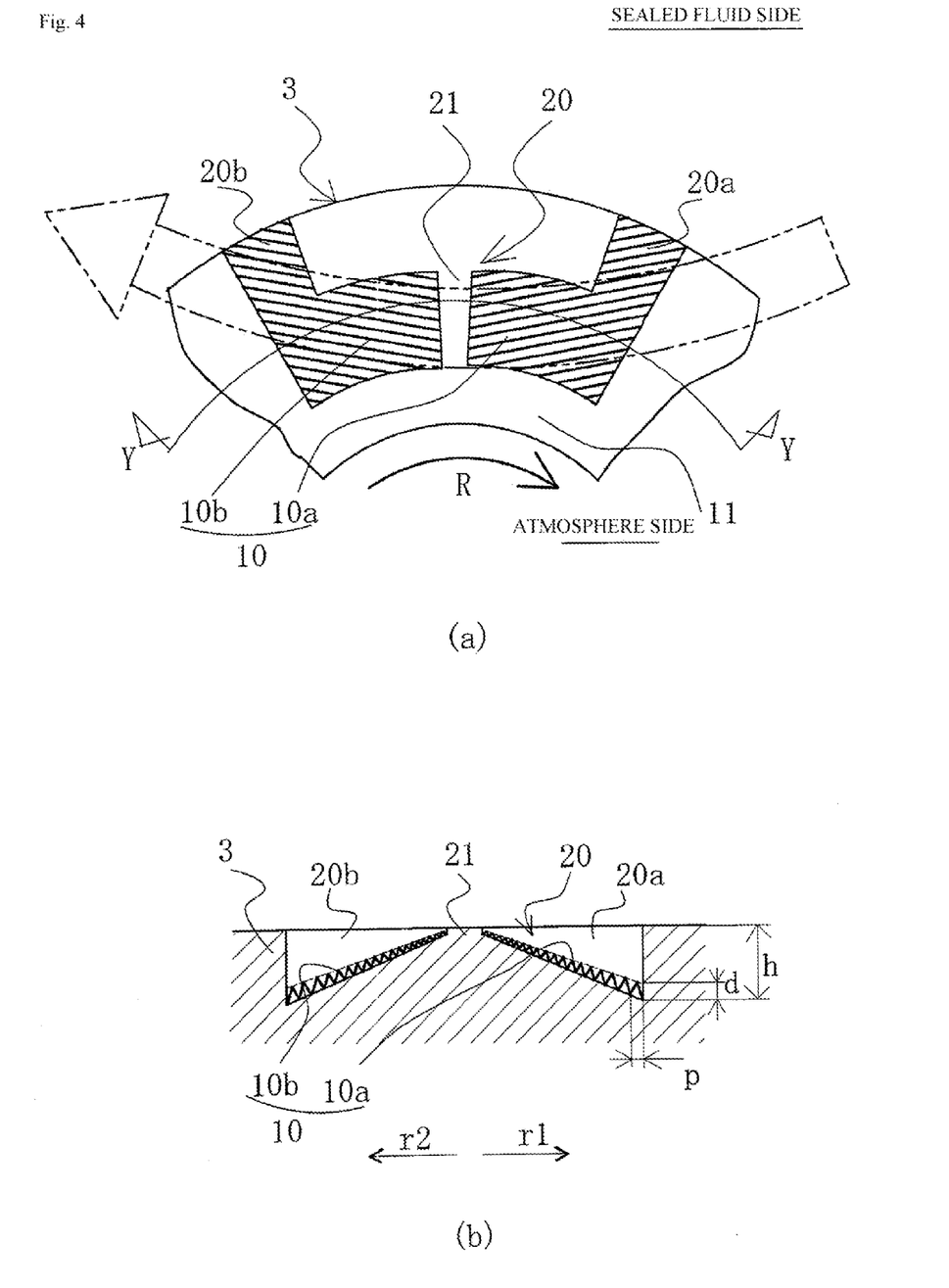
FIG. 4 is an illustration of dynamic pressure-generating grooves and pumping area formed in a sealing face of a rotating ring according to a second embodiment of the present invention, with FIG. 4(*a*) being a plan view thereof and FIG. 4(*b*) being a cross-sectional view along line Y-Y in FIG. 4(*a*)

FIG. 4 is an illustration of dynamic pressure-generating grooves and pumping area formed in a sealing face of a rotating ring according to a second embodiment of the present invention, with FIG. 4(a) being a plan view thereof and FIG. 4(b) being a cross-sectional view along line Y-Y in FIG. 4(a).

In FIG. 4, numbers identical to those in FIG. 3 indicate identical parts of FIG. 3; redundant description of these will be omitted.

The dynamic pressure-generating grooves 20 shown in FIG. 4(a) extend roughly in the radial direction of the sealing face S of the rotating ring 3 from an outer circumferential end towards the inner circumference thereof, and bend in the inner circumferential side to form roughly L-shaped grooves extending roughly in the circumferential direction. The dynamic pressure-generating grooves 20 communicate with the sealed fluid side at the outer circumference of the rotating ring 3, and are configured so as to readily draw the sealed fluid into the grooves.

As shown in FIG. 4(b), the depth of the dynamic pressure-generating grooves 20 gradually varies along the sliding direction in the parts thereof extending in the circumferential direction. Specifically, the depth of the dynamic pressure-generating grooves 20 linearly increases in the direction indicated by arrow r1 in the radial direction groove 20a, and linearly increases in the direction indicated by arrow r2 in the radial direction groove 20b.

Because the tapered shape in the circumferential direction of the radial grooves in the dynamic pressure-generating grooves 20 varies rectilinearly, the depth d between the apexes and troughs of the indentations of the pumping areas 10 preferably also varies continuously in proportion therewith, but a stepped shape is also possible to facilitate machining.

The bottom surfaces of the radial grooves of the dynamic pressure-generating grooves 20 are not limited to varying rectilinearly; they may comprise a combination of a plurality of surfaces inclining at different angles, or the bottom surfaces of the grooves may be curved to yield a curvilinear shape. In all of the above cases, the radial grooves are formed so as to increase in height towards the boundary therebetween.

In the second embodiment, as in the case of the first embodiment, the formation of the seal dam area 11, which is continuous with respect to the circumferential direction, prevents leakage when the sliding parts are stopped, and the sealed fluid is drawn into the pumping areas 10 and a lubricant film is formed on the sealing faces during period of low speed when rotation is beginning, thereby allowing for sufficient lubrication, and enabling sliding resistance to be reduced and stable sliding properties to be obtained. In addition, dynamic pressure is formed on the sealing faces S by the dynamic pressure-generating grooves 20 during rotation, and a lubricant film is formed by the sealed fluid between the sealing faces S of the rotating ring 3 and the stationary ring 6, improving sliding properties. Moreover, leakage of the sealed fluid from the sealing faces when dynamic pressure is being generated can be controlled by the pumping action of the pumping areas, allowing for seal integrity to be controlled. At such time, a flow is generated whereby the sealed fluid is drawn into the intake pumping areas 10a, sent over the sealing face S to the outflow pumping areas 10b located at a separate position with respect to the circumferential direction, and returned to the sealed fluid side through the action of the outflow pumping areas 10b. This sealed fluid flow allows the lubrication of the sealing faces S during rotation to be ensured, leakage to be prevented, and seal integrity to be preserved.

In particular, in FIG. 4, because the pumping areas 10 are formed within the dynamic pressure-generating grooves 20, the sealed fluid is drawn into the radial direction groove 20a on the right, the intake pumping areas 10a formed within the radial direction groove 20a also act to draw in the sealed fluid, the sealed fluid is expelled from the radial direction groove 20b on the left, and the outflow pumping areas 10b formed within the radial direction groove 20b act to expel the sealed fluid to the sealed fluid side. As the radial grooves and the pumping areas act to draw in and expel the sealed fluid, the amount of sealed fluid over the sealing faces S increases, and, simultaneously, a flow is formed such that the sealed fluid is drawn in from the sealed fluid side and expelled back to the sealed fluid side. A sufficient lubricant film is thereby formed by the sealed fluid between the sealing faces S, improving sliding properties, reducing sealed fluid leakage, and allowing for improved seal properties.

In the first and second embodiments described above, the dynamic pressure-generating grooves 20 and the pumping areas 10 are formed on the sealing face of the rotating ring 3, but the reverse configuration, in which the dynamic pressure-generating grooves 20 and the pumping areas 10 are formed on the sealing face of the stationary ring 6, is also possible.

The dynamic pressure-generating grooves 20 and the pumping areas 10 may optionally be inclined with respect to the radial direction as necessary. For example, in FIGS. 3 and 4, it is conceivable for the radial direction groove 20a and the intake pumping areas 10a of the dynamic pressure-generating groove 20 to be formed so as to gradually decrease in height towards the interior with respect to the radial direction, allowing the sealed fluid to be drawn in more easily, and the radial direction groove 20b and the outflow pumping areas 10b of the dynamic pressure-generating groove 20 to be formed so as to gradually increase in height towards the interior with respect to the radial direction, allowing the sealed fluid to be expelled more easily.

In the case of an outside-type mechanical seal in which the sealed fluid side is to the inner circumference side of the rotating ring 3 and the stationary ring 6, the dynamic pressure-generating grooves 20 and the pumping areas 10 are formed facing the inner circumference side.

REFERENCE SIGNS LIST

1 Rotating shaft
2 Sleeve
3 Rotating ring
4 Housing
5 Seal cover
6 Stationary ring
7 Bellows
8 coiled wave spring
9 Bellows
10 Pumping area
10a Intake pumping area
10b Outflow pumping area
11 Seal dam area
20 Dynamic pressure-generating groove
20a, 20b Pair of radial grooves
21 Dam
S Sealing face

The invention claimed is:

1. Sliding parts for allowing opposing sealing faces of an annular stationary ring fixed on a fixed side and an annular rotating ring that rotates along with a rotating shaft to rotate relative to one another, thereby sealing a sealed fluid present on one side in the radial direction of said relatively rotational sealing faces; the sliding parts comprising:
   a plurality of dynamic pressure-generating grooves for generating dynamic pressure via the relative rotational sliding of the stationary ring and the rotating ring being formed in the circumferential direction on the sealing face of one of the stationary ring and the rotating ring so as to communicate with the sealed fluid-containing space; and
   pumping areas for generating pumping action via the relative rotational sliding of the stationary ring and the rotating ring being formed within the dynamic pressure-generating grooves,
   wherein a plurality of groups of the dynamic pressure-generating grooves are constituted by radial grooves and have bottom surfaces having tapered shapes tapering in opposite directions with respect to the circumferential direction so as to decrease in depth as they approach a boundary therebetween, wherein dam parts separating the dynamic pressure-generating grooves are provided at the boundary therebetween, and wherein two adjacent dynamic pressure-generating grooves separated by a dam part are taken as a single group.

2. The sliding parts according to claim 1, wherein the pumping areas are provided with intake pumping areas operating in a direction taking in the sealed fluid and outflow pumping areas operating in a direction in which the sealed fluid is expelled.

3. The sliding parts according to claim 1, wherein said pumping areas have periodic linear indentation structures constituted by linear indentations, said linear indentations being formed so that the direction of the indentations is inclined at a predetermined angle with respect to the sliding direction of the sealing faces.

4. The sliding parts according to claim 3, wherein said plurality of periodic linear indentation structures of said pumping areas are formed so that the directions of said linear indentations of adjacent pumping areas are symmetrical with respect to the sliding direction of the sealing faces.

5. The sliding parts according to claim 3, wherein the periodic linear indentation structures of said pumping areas are formed via irradiation by a femtosecond laser.

6. The sliding parts according to claim 3, wherein a depth d of the linear indentations of the pumping areas is within a range of 0.1 h-10 h, and a pitch p of the indentations being within a range of 0.1 h-10 h, h being a greatest depth of the dynamic pressure-generating grooves.

7. The sliding parts according to claim 1, wherein said dynamic pressure-generating grooves extend roughly in the radial direction of the sealing face from an outer circumferential end towards an inner circumference side thereof, and bend in the inner circumferential side to form roughly L-shaped grooves extending roughly in the circumferential direction.

8. The sliding parts according to claim 1, wherein the tapered shapes of the bottom surfaces with respect to the circumferential direction within the dynamic pressure-generating grooves are stepped, rectilinear, or curvilinear, and said pumping areas have periodic linear indentation structures constituted by linear indentations wherein a depth of the linear indentations of the pumping areas is set so as to vary according to a greatest depth of the dynamic pressure-generating grooves.

9. The sliding parts according to claim 2, wherein said pumping areas have periodic linear indentation structures constituted by linear indentations, said linear indentations being formed so that the direction of the indentations is inclined at a predetermined angle with respect to the sliding direction of the sealing faces.

10. The sliding parts according to claim 4, wherein the periodic linear indentation structures of said pumping areas are formed via irradiation by a femtosecond laser.

11. The sliding parts according to claim 4, wherein a depth d of the linear indentations of the pumping areas is within a range of 0.1 h-10 h, and a pitch p of the indentations being within a range of 0.1 h-10 h, h being a greatest depth of the dynamic pressure-generating grooves.

12. The sliding parts according to claim 5, wherein a depth d of the linear indentations of the pumping areas is within a range of 0.1 h-10 h, and a pitch p of the indentations being within a range of 0.1 h-10 h, h being a greatest depth of the dynamic pressure-generating grooves.

13. The sliding parts according to claim 7, wherein the tapered shapes of the bottom surfaces with respect to the circumferential direction within the dynamic pressure-generating grooves are stepped, rectilinear, or curvilinear, and said pumping areas have periodic linear indentation structures constituted by linear indentations wherein a depth of the linear indentations of the pumping areas is set so as to vary according to a greatest depth of the dynamic pressure-generating grooves.

* * * * *